United States Patent [19]
Okui et al.

[11] Patent Number: 5,715,784
[45] Date of Patent: Feb. 10, 1998

[54] ENGINE BALANCER SHAFT DRIVE

[75] Inventors: Kaoru Okui; Kenichi Sakurai, both of Iwata, Japan

[73] Assignee: Yamaha Hatsudoki Kabushiki Kaisha, Iwata, Japan

[21] Appl. No.: 682,328

[22] Filed: Jul. 17, 1996

[30] Foreign Application Priority Data

Jul. 17, 1995 [JP] Japan ................ 7-203856

[51] Int. Cl.$^6$ .................. F01L 1/02; F02B 75/06
[52] U.S. Cl. ................. 123/192.2; 123/90.27
[58] Field of Search ............... 123/192.2, 90.27, 123/90.31

[56] References Cited

U.S. PATENT DOCUMENTS

| 5,184,582 | 2/1993 | Okui et al. | 123/90.27 |
| 5,464,820 | 11/1995 | Data et al. | 123/192.2 |

FOREIGN PATENT DOCUMENTS

| 0184685 | 6/1986 | European Pat. Off. . |
| 0260174 | 3/1988 | European Pat. Off. . |
| 0369618 | 5/1990 | European Pat. Off. . |
| 0408335 | 1/1991 | European Pat. Off. . |
| 0481837 | 4/1992 | European Pat. Off. . |
| 4134399 | 4/1992 | Germany . |
| 4238148 | 5/1994 | Germany . |
| 1210245 | 10/1970 | United Kingdom . |

OTHER PUBLICATIONS

European Search Report dated Nov. 6, 1996.
Patent Abstracts of Japan, vol. 003, No. 097 (M-069), 17 Aug. 1979 & JP-A-54 071210.

*Primary Examiner*—Noah P. Kamen
*Attorney, Agent, or Firm*—Knobbe, Martens, Olson & Bear LLP

[57] ABSTRACT

An in-line type multi-cylinder, double overhead cam, internal combustion engine having a balancer shaft arrangement that is driven directly off the crankshaft at a point intermediate of the ends of the crankshaft. To permit a more compact engine assembly, the balancer shaft also functions as an accessory drive shaft for driving a number of accessories including the camshafts of the engine.

24 Claims, 5 Drawing Sheets

5,715,784

1

ENGINE BALANCER SHAFT DRIVE

BACKGROUND OF THE INVENTION

This invention relates to an internal combustion engine and more particularly to an improved balancer shaft and drive arrangement for such engines.

As is well know, reciprocating engines normally employ a variety of arrangements for balancing the internal forces generated by the reciprocating masses. Generally, one common way in which the engine is balanced is by counterweights placed upon the crankshaft. However, in many instances, additional or alternative forms of balancing are required. For example, when utilizing engines having certain cylinder numbers, such as three or five, certain forces are frequently balanced by separate balancer shafts. In addition, there may be some instances where the amount of counterweighting on the crankshaft is reduced so as to make the engine more compact and then the balancing must be achieved in another fashion.

For the most part, when engines have been supplied with separate balancer shafts, this balancer shaft is located in such a way as to facilitate driving from the engine crankshaft. This generally is accomplished by placing the balancer shaft in or adjacent to the crankcase. This has a tendency to increase the size of the engine particularly at its lower end. In addition and in many applications, this additional balancer shaft and its drive make the engine more complicated and less compact. In many types of engine applications, however, it is desirable if not essential to have the engine have a compact arrangement even if a balancer shaft is employed.

It is, therefore, a principal object of this invention to provide an improved engine and balancer shaft arrangement.

It is a further object of this invention to provide an improved balancing shaft arrangement for an internal combustion engine.

It is a yet further object of this invention to provide an improved engine having a balancer shaft wherein the balancer shaft also serves the function of providing a drive for various engine auxiliaries and/or accessories.

SUMMARY OF THE INVENTION

This invention is adapted to be embodied in an internal combustion engine that is comprised of a cylinder block forming at least one cylinder bore. A crankshaft is journaled for rotation about a first axis relative to the cylinder block at one end of the cylinder bore. This crankshaft is driven by a piston that reciprocates in the cylinder bore. A balancer shaft is journaled for rotation about a second axis that extends parallel to the first axis and which balancer shaft is driven by the crankshaft. The balancer shaft has an eccentric mass for balancing forces generated within the engine. Means are provided on the balancer shaft for driving an engine accessory directly from the balancer shaft.

2

Figure 2:
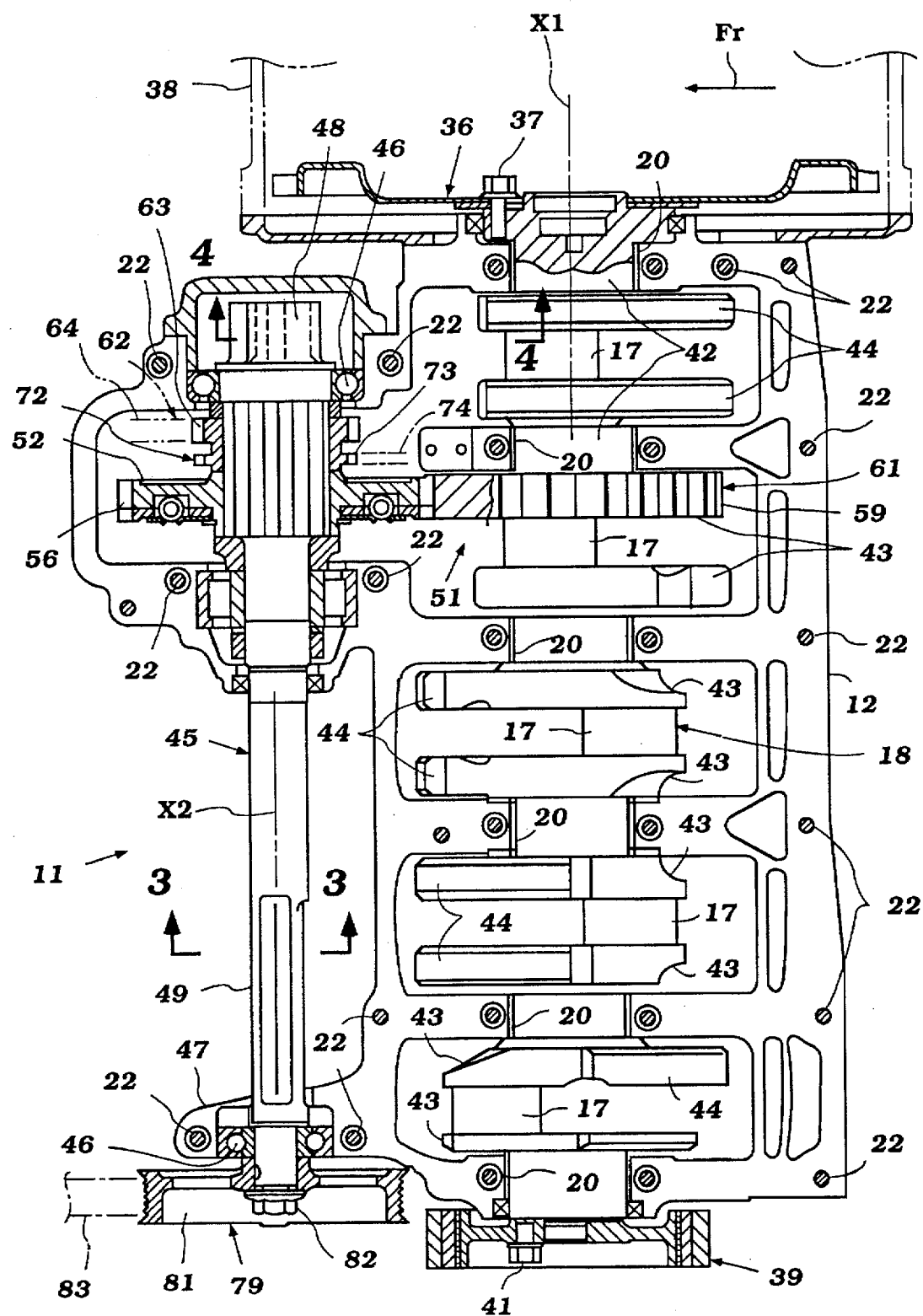
FIG. 2 is a bottom plan view of the internal combustion engine of FIG. 1 and with the crankcase cover removed to show various internal engine components and the balance arrangement.
Figure 3:
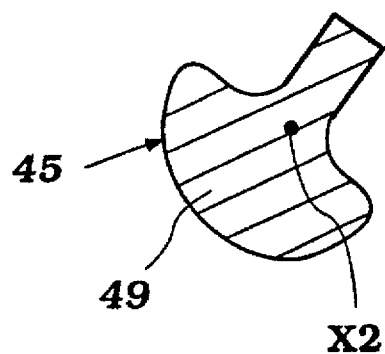

FIG. 3 is a cross-sectional view of the balance shaft taken along lines 3—3 of FIG. 2.

Figure 4:
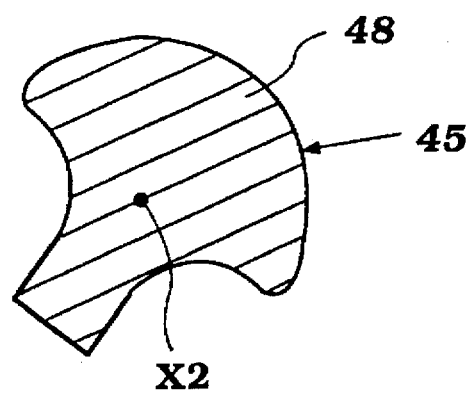

FIG. 4 is a further cross-sectional view of the balancer taken along line 4—4 of FIG. 2.

Figure 5:
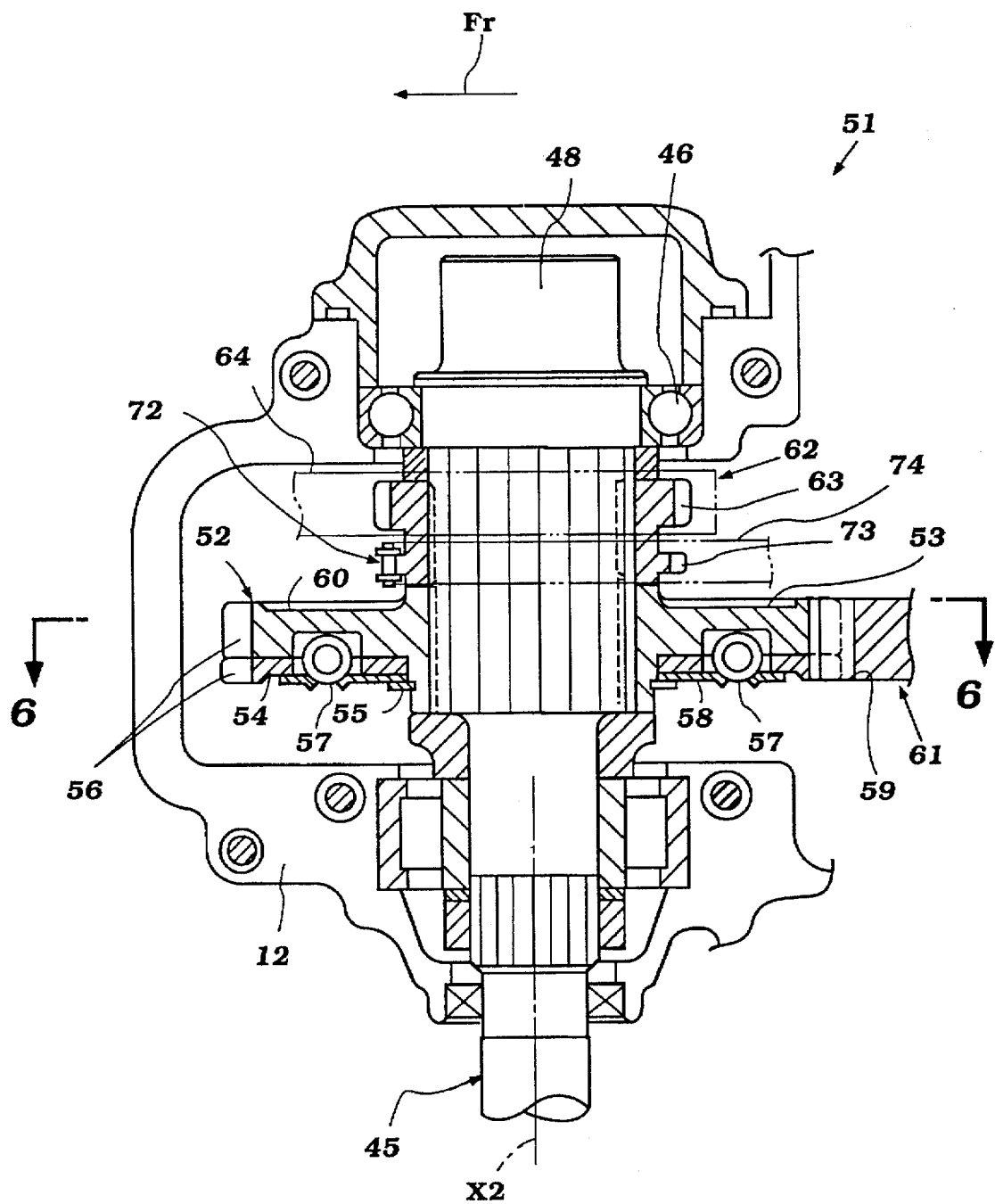

FIG. 5 is an enlarged cross-sectional view of the driven end of the balancer.

Figure 6:
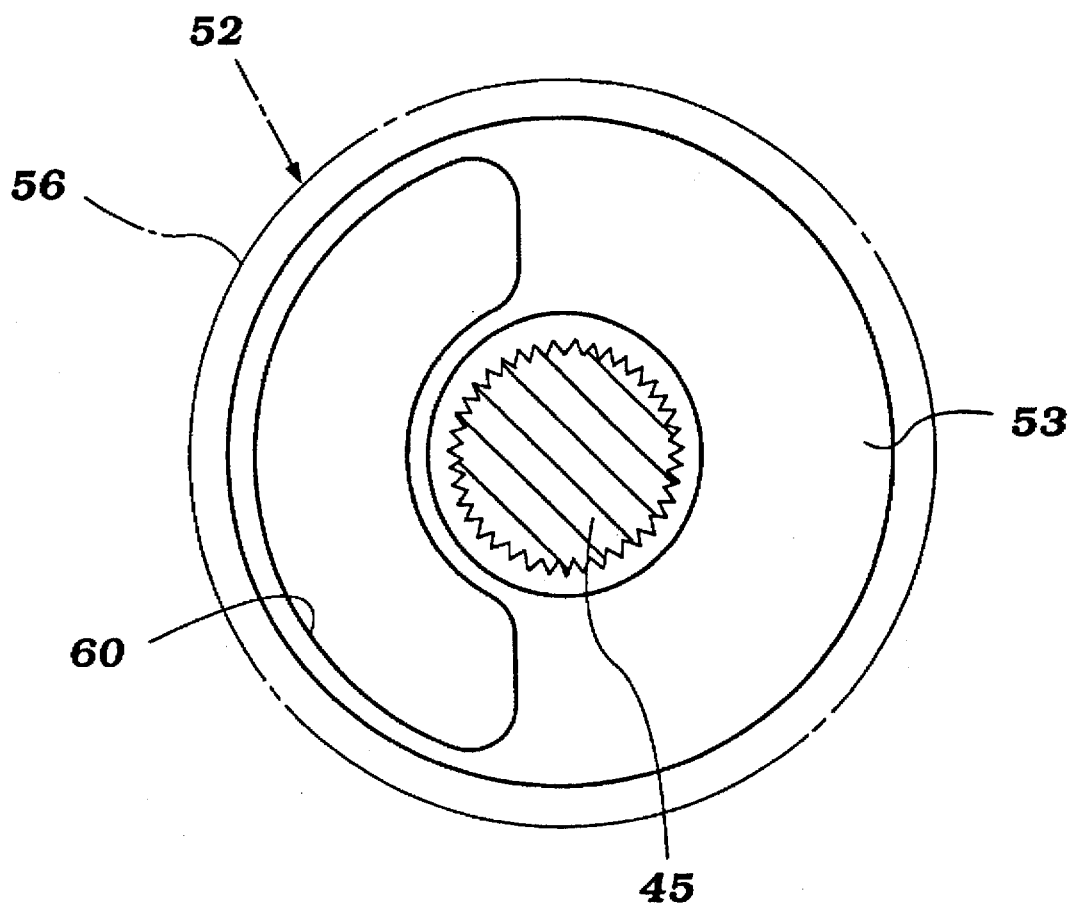

FIG. 6 is a cross-sectional view of a driven gear taken along line 6—6 of FIG. 5.

DETAILED DESCRIPTION OF THE PREFERRED EMBODIMENTS OF THE INVENTION

Figure 1:
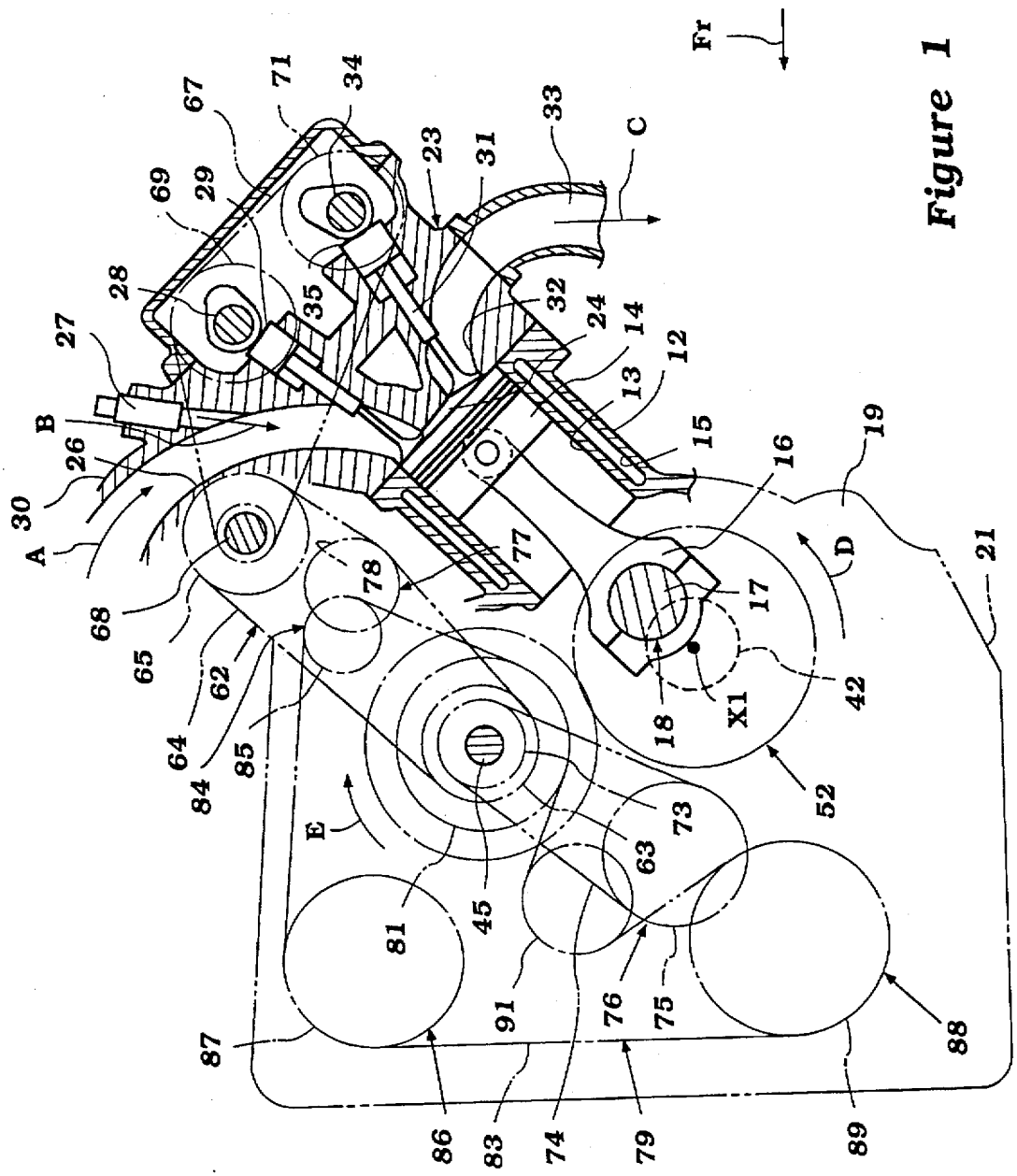
FIG. 1 is a side elevational view of an internal combustion engine that is constructed in accordance with an embodiment of the invention with portions of the engine shown in cross-section and with an accessory drive arrangement shown in phantom.

Referring now to the drawings and initially to FIGS. 1 and 2, an internal combustion engine constructed in accordance with an embodiment of the invention is indicated generally by the reference numeral 11. In the illustrated embodiment, the engine 11 is depicted as being of the five-cylinder, in-line, four-stroke type though it is to be understood that the invention may also be utilized by engines of other configurations. The engine 11 is configured so as to facilitate its use as a propulsion unit for motor vehicle such as an automobile. Particularly the engine 11 is configured for use in a transverse positioning in the vehicle engine compartment, although its use is not so limited. However the compact construction of the engine facilitates such applications even though the engine 11 is capable of having more cylinders than normally possible in such transverse engine orientations.

The engine 11 is comprised of a cylinder block 12 which may be formed of a lightweight material such as east aluminum alloy and defines five cylinder bores 13 in which pistons 14 reciprocate. The engine 11 is water cooled. Hence, a plurality of water jackets 15 are disposed adjacent to the bores 13 so as to provide engine cooling. Additionally, the cylinder bore axes define a first plane that is inclined rearwardly from the vertical when placed transversely in a vehicle engine compartment. As such, the cylinder block 12 slants rearwardly.

The pistons 14 are pivotally connected to the small ends of respective connecting rods that are indicated by the reference numeral 16. The big ends of the connecting rods 16 are rotatably journaled about the throws 17 of the crankshaft 18 which is in turn rotatably journaled within a crankcase 19 by means of main bearings 20 formed integrally by the cylinder block 12 and bearing caps (not shown) fixed thereto in a known manner. The construction of the crankshaft 18 will be discussed in detail later. The crankcase 19 is defined by the lower end of the cylinder block 12 and a lower crankcase member 21 that is joined to the cylinder block 12 by means of bolts 22. A cylinder head 23 is affixed to the upper end of the cylinder block 12 in a known manner and has individual recesses 24 that cooperate with the cylinder bores 13 and pistons 14 to define the engine combustion chambers. Intake valves 25 are slidably supported in the cylinder head 23 and cooperate with intake passages 26 formed in the cylinder head 23. The outer ends of the intake passages 26 terminate at an induction system (having an intake manifold 30 shown only partially) which delivers a supply of atmospheric air indicated by the arrow A in FIG. 2 to the combustion chambers 24. Though not illustrated, one or more throttle valves are disposed within the induction system so as to regulate the air charge delivered to the combustion chambers 24.

Fuel injectors 27 are supported in the intake manifold 30 and discharge fuel supplied from a fuel rail (not shown) into the cylinder head intake passages 26 as indicated by the arrow B in FIG. 2 where it mixes with the air charge A and enters the combustion chambers 24 past the intake valve 25. The fuel injection is controlled by any suitable arrangement.

An overhead intake camshaft 28 is rotatably journaled within the cylinder head 23 about an axis parallel to the crankshaft axis and operates the intake valves 25 through tappets 29. The intake camshaft 28 is driven in a manner to be described later. Exhaust valves 31 are slidably supported in the cylinder head 23 and control the flow of exhaust gases from the combustion chambers 24 into cylinder head exhaust passages 32. The exhaust passages 32 cooperate with an exhaust manifold 33 and exhaust system (not shown) for discharging the exhaust gases indicated by the arrow C from the engine 11 to the atmosphere and for silencing these discharge exhaust gases.

The exhaust valves 31 are operated by means of an overhead exhaust camshaft 34 through tappets 35 and journaled within the cylinder head 23 for rotation about an axis parallel to the intake camshaft axis and driven in a manner to be described.

The crankshaft 18 will now be discussed with particular reference to FIG. 2. The crankshaft 18 is rotatably journaled within the crankcase 19 by the main bearings 20, as noted, and rotates about an axis which is indicated by the line X1. This rotation drives a flywheel 36 that is affixed to one end of the crankshaft 18 by means of bolts 37 and disposed within a transmission housing 38. The flywheel 36 assists in the smooth operation of the engine 11 at low speeds and is also associated with the transmission (not shown) for driving the vehicle powered by the engine 11.

A crankshaft damper 39 is affixed to the other end of the crankshaft 18 by means of bolts 41 and reduces torsional vibrations of the crankshaft 18 about the axis X1 that is induced by the reciprocation of the pistons 14 within their respective cylinder bores 13. This end will be referred to as the "front end" even though the engine 11 is disposed transversely in the illustrated embodiment. In a longitudinal arrangement this end would normally be the front end.

The engine 11 has five cylinder bores 13 and associated pistons 14. Thus, the crankshaft 18 is provided with five throws 17 which cooperate with their respective cylinder bores 13. The throws 17 are connected to the central shaft 42 of the crankshaft 18 by cheek portions 43 which are associated in pairs with each of the throws 17.

The throws 17 are offset from the crankshaft rotational axis X1 and thus the reciprocating pistons 14 and connecting rods 16 exert outwardly directed forces at each of their associated throws 17 and pair of central shafts 42. These forces are balanced by counterweights that are indicated by the reference numeral 44 and formed on the cheeks 43 opposite the throws 17. It is seen in FIG. 1, however, that no counterweights are employed in associated with the throw 17 of the forth cylinder from damper end and that only a single counterweight 44 is associated with the throw 17 of the first cylinder. Thus the crankshaft 18 is unbalanced and therefore further means must be employed for the balancing of the engine 11.

It is well known in the art that additional balancing means are necessary in order to adequately balance engines which utilize a certain number of cylinders such as three or five cylinders. A balancer shaft is frequently employed as the means by which the engine is adequately balanced and is typically positioned underneath the crankshaft inside the crankcase of the engine. This location for the balancer shaft, however, increases the overall height of the engine and may thus cause packaging problems for the vehicle in which the engine is mounted. It is desirable, therefore, to utilize a balancer shaft arrangement where the balancer is positioned in a manner that does not increase the height of the engine while still providing an overall compact assembly.

This invention accomplishes this by disposing the balancer at one side of the engine where it may additionally be utilized to drive the camshafts and various other accessories. A balancer shaft is indicated by the reference numeral 45 and is rotatably journaled within the engine block 12 by means of bearings 46 formed integrally with the cylinder block 12 and beating caps (not shown) fixed thereto. The balancer shaft 45 rotates about an axis X2 that is parallel to and offset to one side of (forwardly in the illustrated embodiment) and upwardly from the rotational axis X1 of the crankshaft 18. The axes X1 and X2 define a plane that intersects the plane defined by the axes of the cylinder bores 13 and extends at some acute angle from this plane. While the balancer shaft 45 is journaled within the cylinder block 12 it should be noted that much of the middle and lower portions of the balancer shaft 45 extend outside the cylinder block 12. That is, the flywheel end of the balancer shaft 45 is disposed within the cylinder block 12 in communication with the crankcase chamber 19 while the other end of the balancer shaft 45 is rotatably journaled within a boss portion 47 of the cylinder block 12.

The balancer shaft 45 includes front end and flywheel end eccentric balancing masses 48 and 49, respectively, which are shown respectively in cross section in FIGS. 3 and 4. These balancing masses 48 and 49 serve as the means by which any remaining engine imbalances are eliminated in a manner that will be discussed.

The balancer shaft 45 is driven at equal speed but in an opposite direction from the crankshaft 18 by means of a direct gear drive 51 that is illustrated in FIGS. 5 and 6 and which includes a gear assembly 52. The gear assembly 52 includes a primary member 53 that is affixed to the balancer shaft 45 through a spline connection as shown in FIG. 6 and a secondary member 54 that has limited relative rotation to the primary member 53. This assembly is held axially against a surface of the primary member 53 by retainer 55. The secondary member 54 is thus held in proximity to the primary member 53 while still being free to rotate relative to the primary member 53 about the second rotational axis X2. Teeth 56 in one-to-one correspondence are provided along the outside edges of the primary and secondary gear members 53 and 54 respectively.

The gear assembly 52 also includes a plurality of springs 57 which are held within the gear assembly 52 by retainers 58 and act between the primary and secondary members 53 and 54. These springs 57 tend to rotate the secondary member 54 such that its teeth 56 can shift in alignment with those of the primary member 53 to take up any lash in the gear train 51. As will be seen below, this misalignment acts as an anti-backlash coupling which improves and silences the operation of the balancer shaft 45.

As best seen in FIG. 1, the teeth 56 of the balancer gear 52 mesh with teeth 59 of a crankshaft drive gear 61 that comprises one of the cheeks 43 of the crankshaft 18 and is associated with the throw 17 from the number 2 cylinder bore 13 and thus spaced inwardly from the ends of the crankshaft 18.

It has been noted that this throw 17 has no counterweights. The main gear portion 53, however, has a cutout 60 so that it is unbalanced. This unbalance mass thus balances for the unbalance of the driving throw 17 of the crankshaft 18. Thus, as seen in FIG. 2, the crankshaft 18 and its associated drive gear 61 which rotate counterclockwise as indicated by the arrow D drives the balancer gear assembly 52 and therefore causes the balancer shaft 45 to rotate clockwise as indicated by the arrow E. This clockwise rotation of the balancer shaft 45 causes the eccentric balancing members 48 and 49 to rotate and generate forces that are equal to the unbalanced forces generated by the crankshaft 18 but act in the opposite direction.

The balance mass 48 at the end of the balance shaft 45 balances for the unbalanced opposite end of the crankshaft 18 and the mass 49 acts to reduce couples along with the other balance masses noted. Thus these forces cancel each other out or, in other words, the balancer shaft 45 balances the engine 11.

With conventional engines it is the practice to drive the camshafts from a camshaft drive arrangement located at one end of the crankshaft. A problem exists with this arrangement, however, in that it adds to the overall length of the engine 11. This increase in length is especially undesirable for those associated motor vehicles in which the engine is mounted transversely across the vehicle. It is desirable therefore to provide a means by which the camshafts are driven which does not add to the longitudinal length of the engine. A feature of this invention accomplishes this by using the balancer shaft to drive the camshafts.

A camshaft drive mechanism 62 (FIGS. 1 and 2) is associated with the balancer shaft 45 and used to drive the camshafts 28 and 34. The camshaft drive mechanism 62 includes a sprocket 63 that is affixed by a spline connection to the rear end of the balancer shaft 45. A chain 64 defines a first flexible transmitter drive which transfers drive from the sprocket 63 to a further sprocket 65 that is affixed to a cam driving shaft 66 which is rotatably journaled within and at one side of the cylinder head 23 forwardly of the intake passage 26.

A further chain 67 defines a second flexible transmitter drive which is driven by a sprocket 68 on the cam driving shaft 66 and drives a pair of sprockets 69 and 71 that are associated with the overhead camshafts 28 and 34, respectively.

As is well known, the camshafts 28 and 34 are normally driven at one-half crankshaft speed. Usually this is accomplished by means of a two-to-one gear or sprocket reduction between the crankshaft and the camshafts. Such large reductions in a single drive tend to cause the gears and/or sprockets associated with the camshafts to be unduly large. In accordance with this invention, a portion of the speed reduction occurs between the sprockets 63 and 65 and the remainder of the reduction between the sprocket 68 and 69 and 71 on the camshafts 28 and 34 such that the two combined ratios give the desired one-half speed reduction.

The balancer shaft 45 is also used to drive a plurality of additional engine accessories. A first accessory drive mechanism is indicated by the reference numeral 72 and includes a drive sprocket 73 (still referring to FIGS. 1 and 2). The first accessory drive mechanism 72 is formed integrally with the camshaft drive mechanism 62 with the sprocket 73 disposed underneath the cam sprocket 63 and adjacent to the direct gear drive gear assembly 51 as is seen in FIGS. 1 and 5. The sprocket 73 drives a chain 74 which then transfers drive to a sprocket 75 that is associated with an oil pump 76 that is affixed to a forward end of the crankcase 19 beneath the plane defined by the axes X1 and X2 by any suitable means.

A water pump 77 is mounted to the engine block 12 above the plane defined by the axes X1 and X2 and forward of the plane defined by the cylinder bores 13 between the balancer shaft 45 and cam driving shaft 66 such that a sprocket 78 associated with the shaft of the water pump 77 is driven off of the first flexible transmitter drive 64. Thus, the water pump 77 is driven off of the balancer shaft 45 and pumps cooling water to the water jackets 15.

A second accessory drive mechanism is indicated by the reference numeral 79 and includes a pulley 81 that is affixed to the front end of the balancer shaft 45 inwardly from the damper 39 by a bolt 82. The pulley 81 drives a serpentine belt 83 which, in turn, transmits drive to a trio of pulleys for powering other accessories. An alternator 84 is disposed forwardly of the first plane defined by the cylinder bores 13 as seen in FIG. 1 and driven by the belt 83 through an alternator pulley 85.

A power steering pump 86 is disposed forwardly of the alternator 84 beneath the plane defined by the axes X1 and X2 and driven by a pulley 87 associated with the belt 83. Finally an air compressor 88 is affixed to the forward lower end of the crankcase member 21 and driven by the belt 83 through a pulley 89. An idler pulley 91 is also affixed to the engine block 12 in association with the serpentine belt 83 so as to maintain tension in the belt 83.

It should be readily apparent that the above-described invention is provided with a balancer shaft which, in addition to balancing the engine serves as the means by which various engine and other accessories are driven and also provides for a compact engine configuration where the accessories are disposed forwardly of the engine and thus do not contribute to the longitudinal length of the engine. Of course, the foregoing description is that of a preferred embodiment of the invention, and various changes and modifications may be made without departing from the spirit and scope of the invention, as defined by the appended claims.

What is claimed is:

1. An internal combustion engine comprised of a cylinder block forming a plurality of aligned cylinder bores, a crankshaft journaled for rotation about a first axis relative to said cylinder block at one end of the said cylinder bore, a plurality of pistons each reciprocating in a respective one of said cylinder bores and driving said crankshaft, said crankshaft having a plurality of throws each associated with a respective piston in a respective one of said cylinder bores, a balancer shaft journaled for rotation about a second axis parallel to said first axis, means for driving said balancer shaft directly from said crankshaft at a point between two of said cylinder bores and spaced inwardly from the ends of said crankshaft, said balancer shaft having an eccentric mass for balancing forces in said engine, and means on said balancer shaft for driving an engine accessory therefrom.

2. An internal combustion engine as set forth in claim 1, wherein the balancing mass on the balancer shaft is formed on one end of the balancer shaft.

3. An internal combustion engine as set forth in claim 2, wherein the means for driving an engine accessory is disposed at one end of the balancer shaft.

4. An internal combustion engine as set forth in claim 3, wherein the means for driving an engine accessory is disposed at the one end of the balancer shaft.

5. An internal combustion engine as set forth in claim 3, wherein the means for driving the engine accessory is disposed at the end of the balancer shaft opposite to that where the balancer mass is.

6. An internal combustion engine as set forth in claim 5, further including means for driving an additional accessory directly from the balancer shaft at the other end of the balancer shaft.

7. An internal combustion engine comprised of a cylinder block forming at least one cylinder bore, a crankshaft journaled for rotation about a first axis relative to said cylinder block at one end of the said cylinder bore, a piston reciprocating in said cylinder bore and driving said crankshaft, a balancer shaft journaled for rotation about a second axis parallel to said first axis, means for driving said balancer shaft directly from said crankshaft, said balancer shaft having an eccentric mass for balancing forces in said engine, a camshaft journalled for rotation about a third axis spaced from said first and said second axes for operating at least one valve for said engine, and means on said balancer shaft for driving said camshaft.

8. An internal combustion engine as set forth in claim 7, wherein the accessory drive is disposed adjacent the point where the balancer shaft is driven from the crankshaft.

9. An internal combustion engine as set forth in claim 7, wherein the engine is provided with a pair of overhead mounted camshafts both driven from the balancer shaft.

10. An internal combustion engine as set forth in claim 9, wherein the balancer shaft drives a cam driving shaft through a first flexible transmitter drive and wherein the cam driving shaft drives the camshafts through a second flexible transmitter drive.

11. An internal combustion engine as set forth in claim 10, wherein the cam shafts are journaled in a cylinder head assembly which is affixed to the cylinder block at the other end of the cylinder block from the crankshaft and the cam driving shaft is also journaled in the cylinder head.

12. An internal combustion engine as set forth in claim 11, wherein the balancer shaft is driven from the crankshaft at a point between two of the cylinder bores and spaced inwardly from the ends of the crankshaft.

13. An internal combustion engine as set forth in claim 12, wherein the balancing mass on the balancer shaft is formed on one end of the balancer shaft.

14. An internal combustion engine as set forth in claim 13, wherein a further means for driving another engine accessory is disposed at one end of the balancer shaft.

15. An internal combustion engine as set forth in claim 14, wherein the means for driving another engine accessory is disposed at the one end of the balancer shaft.

16. An internal combustion engine as set forth in claim 9, wherein the means for driving the other engine accessory is disposed at the end of the balancer shaft opposite to that where the balancer mass is.

17. An internal combustion engine as set forth in claim 16, further including means for driving an additional accessory directly from the balancer shaft at the other end of the balancer shaft.

18. An internal combustion engine as set forth in claim 7, wherein the balancer shaft is driven from the crankshaft through a direct gear drive.

19. An internal combustion engine as set forth in claim 18, wherein the direct gear drive includes a coupling for reducing backlash in the direct gear drive.

20. An internal combustion engine as set forth in claim 18, wherein a plurality of aligned cylinder bores are formed in the cylinder block and wherein the crankshaft has a plurality of throws each associated with a respective piston in a respective one of said cylinder bores.

21. An internal combustion engine as set forth in claim 20, wherein the balancer shaft is driven from the crankshaft at a point between two of the cylinder bores and spaced inwardly from the ends of the crankshaft.

22. An internal combustion engine as set forth in claim 21, wherein the crankshaft gear for driving the balancer shaft is formed on a throw of the crankshaft that is not balanced and the driven gear of the balancer shaft has an eccentric mass for balancing that crankshaft throw.

23. An internal combustion engine as set forth in claim 21, wherein one of the throws at one end of the crankshaft is not balanced and a balancing mass is formed at the opposite end of the balancer shaft for balancing the effect of the unbalanced crankshaft throw.

24. An internal combustion engine as set forth in claim 23, wherein a second balancing mass is provided along the length of the balancer shaft spaced from the first mentioned balancing mass.

\* \* \* \* \*